UNITED STATES PATENT OFFICE.

JAMES L. KRAFT, OF CHICAGO, ILLINOIS.

PROCESS OF STERILIZING AND PACKAGING CHEESE.

1,350,870.  Specification of Letters Patent.  Patented Aug. 24, 1920.

No Drawing.  Application filed October 18, 1919. Serial No. 331,632.

*To all whom it may concern:*

Be it known that I, JAMES L. KRAFT, a citizen of the United States, residing at Chicago, in the county of Cook and State of Illinois, have invented or discovered a certain new and Improved Process of Sterilizing and Packaging Cheese, of which the following is a specification.

This invention or discovery relates to an improved process of sterilizing and packaging cheese, and applies more specifically to the treatment of cheese of the Cheddar genus. I have heretofore patented a somewhat similar process of sterilizing cheese, in my Patent No. 1,186,524, dated June 26, 1916, which process has proven very successful and gone into extended use. My present invention or discovery effects certain economies in cost of treatment, shortens the time during which highly skilled supervision of the process is required, and tends to better retain and preserve the more delicate flavors of the cheese.

With the foregoing and other objects in view, the invention consists in the matter hereinafter described, and more particularly pointed out in the appended claims.

As clearly set forth in my patent above referred to, the fundamental difficulty of sterilizing cheese of the Cheddar genus by heat is in keeping the cheese from disintegrating, *i. e.*, preventing the butter fat from separating from the casein when the cheese is heated to the necessary sterilizing temperature. I have now discovered how to so treat the cheese as to raise its disintegration-temperature-point above the temperature required to effectively sterilize it, and to effect this result by a low temperature treatment;— a temperature considerably below that at which effective sterilization can be secured.

Describing the preferred way of carrying out the process, I select cheese of the desired kind, condition and degree of ripeness and, after removing the bandages, comminute the cheese, usually by the use of an ordinary cheese slicing or grinding machine. I next place the cheese in a steam or water-jacketed kettle or other suitable heating vessel, wherein it may be subjected to the required temperature without scorching. The kettle or other heating vessel is preferably equipped with mechanical stirrers, by which the cheese may be stirred actively while undergoing treatment, but the stirring may be done manually with a paddle, spoon or other suitable implement.

The steam, hot-water, or other kind of heat is applied to the vessel and the temperature of the contents thereof gradually raised until the cheese is thoroughly melted. While the cheese is being melted it is actively stirred and this stirring is continued until the cheese reaches the proper condition sought by this step. The temperature of the cheese is raised to about 120° to 140° Fahrenheit, after reaching which temperature the heat is so regulated as to prevent it from rising much higher; but the temperature is maintained for a period and until the cheese reaches a condition which I term a stably-homogenized condition. The heat-and-stirring treatment is then stopped. This stably-homogenized condition has been reached, and is shown, when the cheese appears smooth and homogeneous throughout, and has a marked viscous consistency, so that it can be drawn out, while hot, into long attenuated strings like taffy or very thick syrup. Ordinarily, the homogeneous treatment will require from 30 to 50 minutes to raise the temperature of the cheese to the desired point, and a further treatment of from 10 to 15 minutes to bring it to a fully stably-homogenized condition.

At the conclusion of the homogenizing step, the cheese is in condition to withstand an indefinitely continued temperature of 212° F., or more, without disintegration or separating out of its butter fat, although it be subjected to such heat without stirring or agitation.

The cheese is next placed in cans, jars, or other containers, capable of being hermetically sealed, and after being sealed is processed to effect sterilization.

To secure effective sterilization so as to insure permanent keeping qualities in the cheese under all climatic conditions, it must be brought to a temperature of about 175° F. and kept at or above that temperature for about fifteen minutes, although a somewhat lower temperature, say 160° F., continued for a longer time, say twenty or thirty minutes, is usually sufficient to effectively sterilize.

Accordingly, after the cheese has been put in containers and sealed, I put it in a steam chamber, or hot water, and subject it to the above described sterilizing heat for the requisite period. I do not find it necessary, or even desirable, to leave the cans unsealed while being processed, as is sometimes done, but, of course, this way of proceeding is feasible, in which case each can or container must be sealed while the contents are in sterile condition.

Treating the cheese at a low temperature only while exposed to atmospheric and undergoing stirring or agitation, and subjecting the cheese to the required higher sterilizing temperature under sealed condition, minimizes the changes in flavor of the cheese due to heating it. That is to say, my present process, I believe, preserves the delicate flavors of the cheese somewhat better than does the process of my Patent No. 1,186,524. Because the open heating is at a lower temperature and for a shorter period, any possible change of flavor due to heat is minimized, and less moisture and less of the aroma of the cheese are expelled and lost. Inasmuch as skilled or expert supervision is required only during the period of the homogenizing step, a saving is effected in that respect. The possibility of infection while the cheese is being canned or packaged is avoided, since the sterilization is effected after the canning is completed.

The herein described process of stably-homogenizing cheese is useful and valuable without carrying the cheese through the subsequent canning and sterilizing steps. Cheese thus stably-homogenized will keep as well and perhaps somewhat better than ordinary untreated cheese, without being sterilized, and it may be kept for a long time if placed in the proper containers which are not air-tight. Such cheese is admirably adapted for making Welsh rarebits and other foods in which the cheese is cooked, for the reason that it melts and blends, or mixes with the other ingredients without disintegrating or becoming lumpy or grainy.

It will be obvious that the process herein described may be modified somewhat without departing from the invention.

I claim as my invention:

1. The process of putting up cheese of the Cheddar genus, which consists in melting the cheese, actively stirring it while melted, and while below a temperature at which effective heat sterilization would take place, until brought to a stably-homogenized condition, then placing it in suitable containers and subjecting it to heat sufficient to effectively sterilize and render the cheese permanently keeping in all climatic conditions so long as it remains hermetically sealed.

2. The process of treating cheese of the Cheddar genus, which consists in melting the cheese, and actively stirring it while melted and while below a temperature at which effective heat sterilization would take place, until brought to a stably-homogenized condition.

3. The process of putting up cheese of the Cheddar genus, which consists in comminuting the cheese, then melting the cheese, actively stirring it during melting, while melted, and while maintained at a temperature below that at which effective heat sterilization would take place, until brought to a stably-homogenized condition, then placing it in suitable containers, sealing it therein, and subjecting said sealed containers and the contents to heat sufficient to effectively sterilize and render the cheese permanently keeping in all climatic conditions so long as it remains hermetically sealed.

4. The process of putting up cheese of the Cheddar genus, which consists in melting the cheese, actively stirring the cheese during melting and while melted and maintained at a temperature between 120° F. and 150° F. until brought to a stably-homogenized condition, then placing it in suitable sealed containers and subjecting it to a temperature in excess of 160° F. maintained for a period of not less than fifteen minutes.

JAMES L. KRAFT.